(12) United States Patent
Hasegawa et al.

(10) Patent No.: US 8,228,919 B2
(45) Date of Patent: Jul. 24, 2012

(54) COMMUNICATION DEVICE, AND COMMUNICATION METHOD AND PROGRAM THEREOF

(75) Inventors: Yohei Hasegawa, Tokyo (JP); Tutomu Murase, Tokyo (JP)

(73) Assignee: NEC Corporation, Tokyo (JP)

( * ) Notice: Subject to any disclaimer, the term of this patent is extended or adjusted under 35 U.S.C. 154(b) by 782 days.

(21) Appl. No.: 10/576,789

(22) PCT Filed: Oct. 18, 2004

(86) PCT No.: PCT/JP2004/015756
§ 371 (c)(1),
(2), (4) Date: Jun. 7, 2006

(87) PCT Pub. No.: WO2005/039150
PCT Pub. Date: Apr. 28, 2005

(65) Prior Publication Data
US 2007/0071004 A1 Mar. 29, 2007

(30) Foreign Application Priority Data
Oct. 22, 2003 (JP) ................................. 2003-361339

(51) Int. Cl.
*H04L 12/28* (2006.01)
(52) U.S. Cl. ..................................... 370/395.3; 710/36
(58) Field of Classification Search .................. 370/428, 370/429, 389, 395.3; 711/216; 375/240.26, 375/240.29, 240.23
See application file for complete search history.

(56) References Cited

U.S. PATENT DOCUMENTS

| | | | | |
|---|---|---|---|---|
| 6,304,578 B1* | 10/2001 | Fluss | | 370/413 |
| 6,965,646 B1* | 11/2005 | Firestone | | 375/240.26 |
| 2002/0188614 A1* | 12/2002 | King | | 707/100 |
| 2003/0018878 A1* | 1/2003 | Dorward et al. | | 711/216 |
| 2003/0118107 A1* | 6/2003 | Itakura et al. | | 375/240.19 |
| 2003/0158980 A1* | 8/2003 | Mizuno | | 710/36 |
| 2003/0169759 A1* | 9/2003 | Asai | | 370/429 |
| 2004/0010612 A1* | 1/2004 | Pandya | | 709/230 |

FOREIGN PATENT DOCUMENTS

| | | |
|---|---|---|
| JP | 64-027343 A | 1/1989 |
| JP | 2000-156706 A | 6/2000 |
| JP | 2000-261478 | 9/2000 |
| JP | 2002-185488 A | 6/2002 |
| JP | 2003-110604 | 4/2003 |

* cited by examiner

*Primary Examiner* — Dang Ton
*Assistant Examiner* — Wei Zhao
(74) *Attorney, Agent, or Firm* — Foley & Lardner LLP

(57) ABSTRACT

In a communication device (1) which realizes communication with data distributed to a plurality of connections, a data division restoration processing unit (1-2), when transmitting data, receives data from an application processing unit (1-1), divides the data into an arbitrary number of blocks, stores information for restoring the block to original data within a TCP header and sends the data to a network processing unit (1-3) by using an arbitrary number of TCP connections, and when receiving data, refers to restoration information stored within the TCP header with respect to data of the plurality of TCP connections received from the network processing unit (1-3), identifies a divisional block, combines the blocks to restore data as of before division and sends the data to the application processing unit (1-1).

54 Claims, 11 Drawing Sheets

TCP Timestamps Option (TSopt):

kind: 8  ⎫
         ⎬ — IN CASE OF
Length: 10 bytes ⎭

| Kind=8 | 10 | TS Value (TSval) | TS Echo Reply (Tsecr) |
|--------|----|------------------|-----------------------|

COMMUNICATION DEVICE, AND COMMUNICATION METHOD AND PROGRAM THEREOF

BACKGROUNDS OF THE INVENTION

1. Field of the Invention

The present invention relates to a communication device, and a communication method and a program thereof and, more particularly, a communication device which realizes communication with data distributed to a plurality of connections, and a communication method and a program thereof.

2. Description of the Related Art

There conventionally exists a communication method of distributing data of one communication flow which is used in communication between a transmission terminal and a reception terminal to a plurality of flows and lastly restoring the same. There exists, for example, a method of, with a gateway disposed in each of a LAN (Local Area Network) in which a transmission terminal is provided and a LAN in which a reception terminal is provided, allotting, at the gateway in the vicinity of the transmission terminal, data of a TCP (Transmission Control Protocol) connection which is sent from the transmission terminal to each communication path on a packet basis and correcting an inverted order of a packet at the gateway in the vicinity of the reception terminal according to a TCP sequence number (see Japanese Patent Laying-Open No. 2000-261478).

This method, however, has a problem that a communication path can not fully exhibit its performance because the TCP of the terminal realizes operation premised on being used in one communication path.

Among methods of efficiently using a plurality of communication lines to improve a rate of line use are the following methods.

First method is adding a function to a TCP of a terminal to change communication conventionally using one TCP connection to use a plurality of TCP connections (Multipath TCP, <Multipath Proxy Server>, see Japanese Patent Laying-Open No. 2003-110604).

This method includes a method of dividing data communication which is executed by one communication flow in communication between a transmission terminal and a reception terminal into a plurality of communication flows and sending the data in parallel. When transmitting data from the transmission terminal to the reception terminal, a communication protocol of the transmission terminal divides communication data of one communication flow and allots the divided data to a plurality of communication flows, the reception terminal adds, into packet data of a TCP/IP packet, a new header as restoration information for restoring the divided data to original data and transmits the data by each communication flow, and a communication protocol of the reception terminal refers to the restoration information of the data received from the plurality of communication flows and restores one communication flow to restore original data.

First problem is that according to the first method, addition of a new header into a packet to divide and restore data leads to an increase in a header to reduce communication efficiency.

Second problem is that since according to the first method, addition of a new header into a packet to divide and restore data leads to an increase in a header to change segmentation for dividing data by packets, an application not taking change of segmentation into account fails to execute normal communication.

In particular, when data received by one connection is transmitted to a proxy server with data distributed to a plurality of connections by using the first method, re-segmentation is required without fail.

Third problem is that when there exists, in the course of a network path used by a communication device according to the first method, a device outside a control management range which fails to take the present method into consideration to change segmentation, normal communication is impossible by the first method.

Fourth problem is that since according to the first method, at the time of transmitting divided data in parallel by a plurality of connections, data is transferred to a TCP connection processing process on a packet basis, the number of times of issuance of a write instruction is increased to increase processing load.

SUMMARY OF THE INVENTION

Accordingly, an object of the present invention is to provide a communication device which enables communication involving flow division and restoration to be efficiently realized by preventing a header from being increased, and a communication method and a program thereof.

In order to solve the above-described problems, the communication device according to the present invention, which is a communication device realizing communication with data distributed to a plurality of connections, is characterized in having a function of storing, within a header, information for restoring data distributed to the respective connections.

The communication method according to the present invention, which is a communication method realizing communication with data distributed to a plurality of connections, is characterized in including processing of storing, within a header, information for restoring data distributed to the respective connections.

The program according to the present invention, which is a program for causing a computer to execute a communication method of realizing communication with data distributed to a plurality of connections, is characterized in including processing of storing, within a header, information for restoring data distributed to the respective connections.

Since according to the present invention, information for restoring data distributed to the respective connections is stored within a header, no header is increased.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

THE BEST MODE FOR IMPLEMENTING THE INVENTION

In the following, embodiments of the present invention will be described with reference to the accompanying drawings.

First Embodiment

Figure 1:
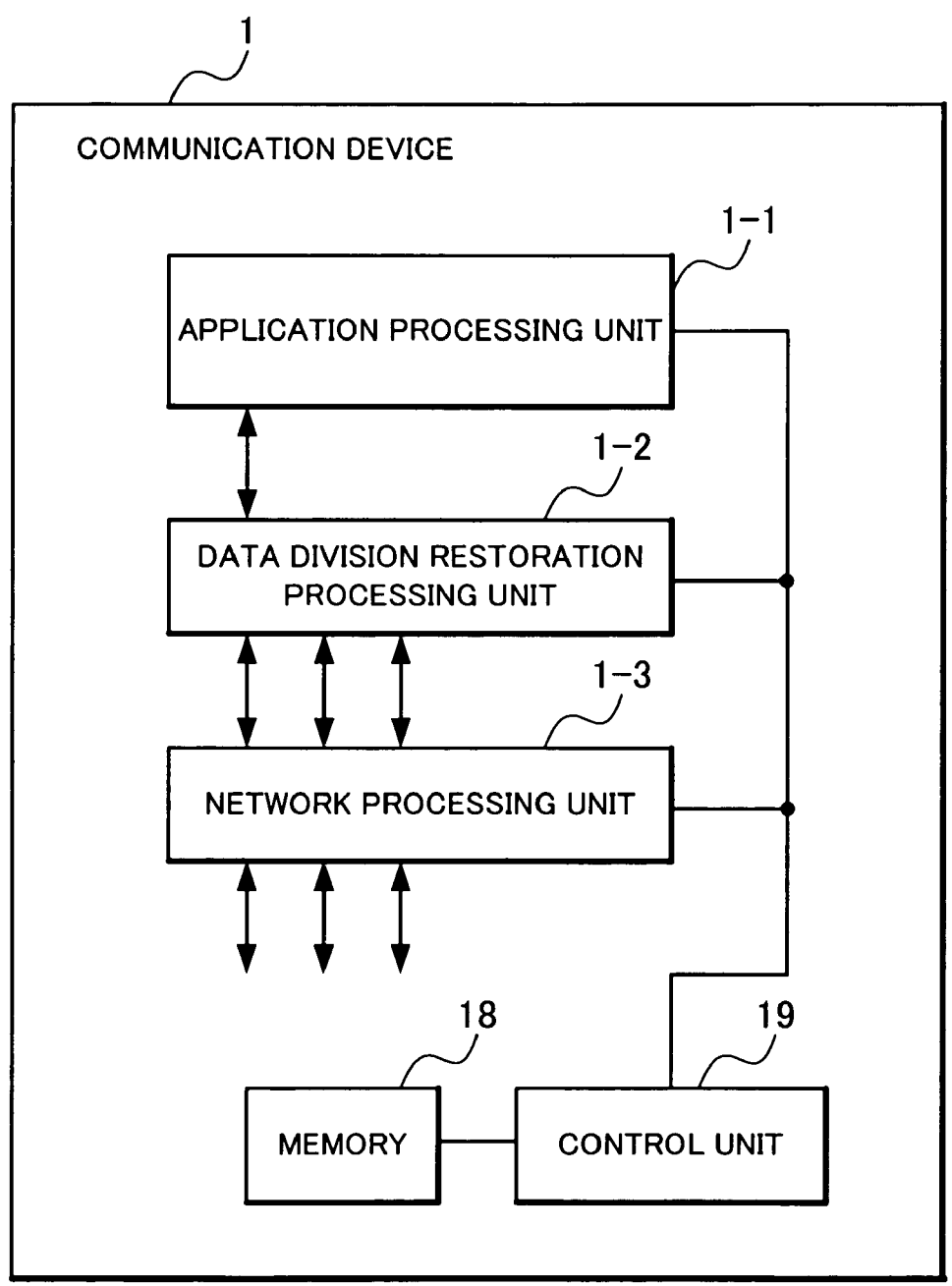
FIG. 1 is a block diagram showing a structure of a communication device according to a first embodiment of the present invention.

FIG. 1 is a block diagram showing a structure of a communication device according to a first embodiment of the present invention. In the first embodiment, a communication device 1 includes an application processing unit 1-1, a data division restoration processing unit 1-2 and a network processing unit 1-3.

The application processing unit 1-1 has a function of processing an arbitrary application program and when transmitting data, sending the data to the data division restoration processing unit 1-2 and when receiving data, receiving the data from the data division restoration processing unit 1-2.

The data division restoration processing unit 1-2 has a function of, when transmitting data, receiving the data from the application processing unit 1-1, dividing the data into an arbitrary number of blocks, storing information for restoring the blocks to the original data within a TCP header and sending the obtained data to the network processing unit 1-3 by using an arbitrary number of TCP connections, and when receiving data, referring to restoration information stored within a TCP header with respect to data of the plurality of TCP connections received from the network processing unit 1-3, identifying divided blocks, combining the divided blocks to restore data as of before the division and sending the obtained data to the application processing unit 1-1.

The network processing unit 1-3 has a function of, when transmitting data, outputting data of a TCP connection received from the data division restoration processing unit 1-2 to a network and when receiving data, sending data of a TCP connection applied from the network to the data division restoration processing unit 1-2.

Figure 2:
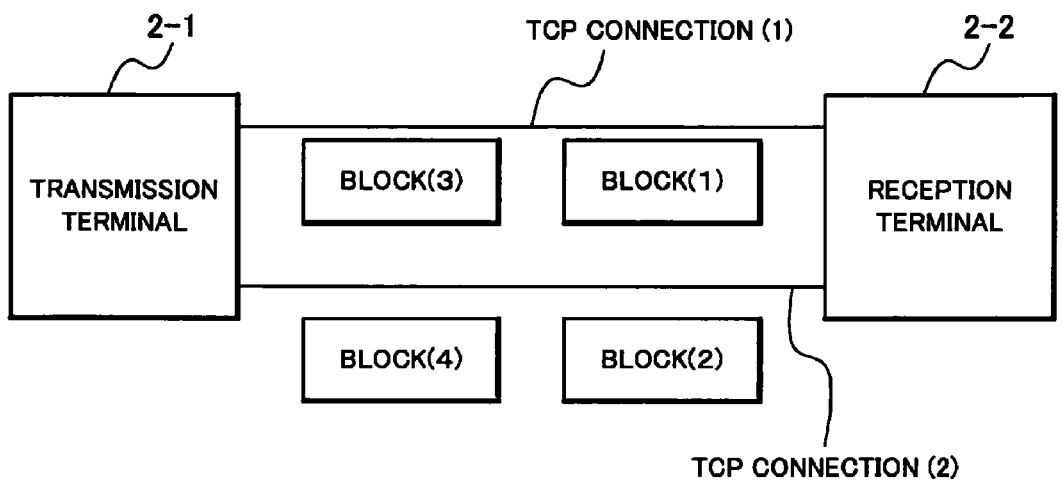
FIG. 2 is a block diagram showing a flow of data from a transmission terminal 2-1 to a reception terminal 2-2 according to the first embodiment.
Figure 3:
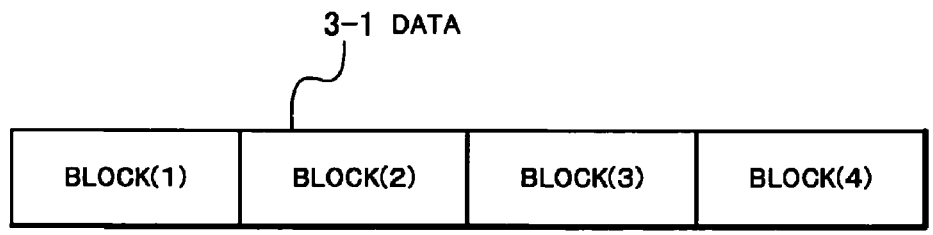
FIG. 3 is a diagram showing a data dividing method and a divided block according to the first embodiment.

FIG. 2 is a block diagram showing a flow of data from a transmission terminal 2-1 to a reception terminal 2-2 according to the first embodiment and FIG. 3 is a block diagram showing a data dividing method and divided blocks according to the first embodiment. In FIG. 2, when sending data from the transmission terminal 2-1 to the reception terminal 2-2, the transmission terminal 2-1 divides data to be transmitted into a plurality of blocks as shown in FIG. 3 and stores information for restoring the data within a TCP header to send the obtained data to the reception terminal 2-2 by using a plurality of TCP connections.

FIG. 2 shows an example in which data 3-1 is divided into four blocks (1) to (4) and using two TCP connections (1) and (2), the blocks (1) and (3) are transmitted by the TCP connection (1) and the blocks (2) and (4) are transmitted by the TCP connection (2).

Upon receiving a block from the transmission terminal 2-1, the reception terminal 2-2 refers to restoration information stored within the TCP header, identifies the divisional blocks and aligns the blocks in order to restore the original data from the plurality of blocks.

In FIG. 2, the reception terminal 2-2 aligns the blocks (1) to (4) received from the TCP connections (1) and (2) in order to restore the original data.

Figure 4:
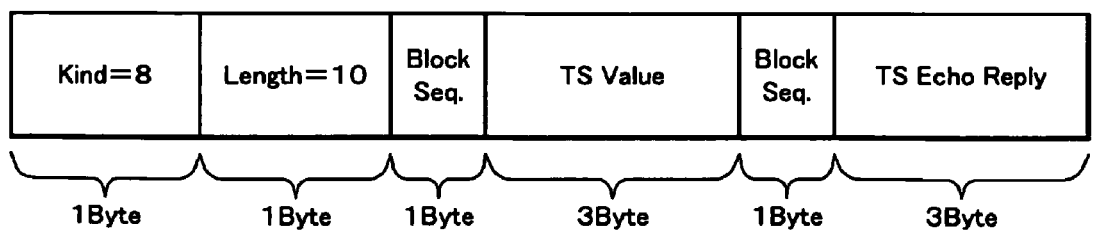
FIG. 4 is a diagram showing an example of storing data restoration information within a TCP header by a data division restoration processing unit according to the first embodiment.

FIG. 4 is a diagram showing an example of storage of data restoration information within the TCP header by the data division restoration processing unit according to the first embodiment. After dividing the data to generate a plurality of blocks, the transmission terminal 2-1 stores their block numbers in a part of a TCP timestamp option.

Figures 5, 6:
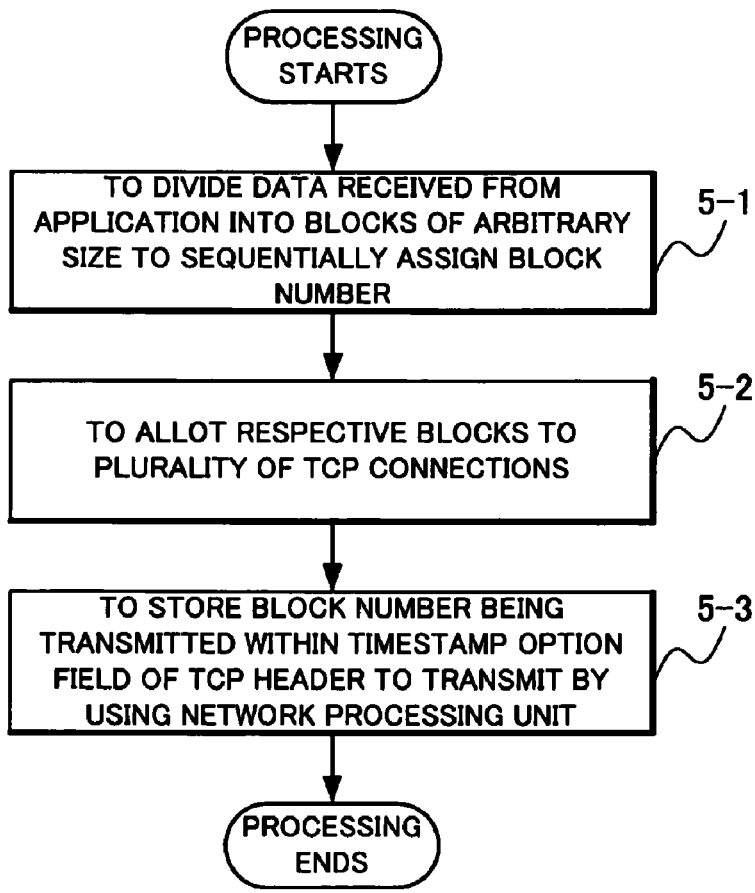
FIG. 5 is a diagram showing a format of a timestamp option of TCP.
FIG. 6 is a flow chart showing outlines of processing by the transmission terminal 2-1 according to the first embodiment.

FIG. 5 is a diagram showing a format of a timestamp option of the TCP. The TCP timestamp option is stored in an option field of a TCP header in the format shown in FIG. 5. With reference to the figure, the TCP timestamp option includes a kind (Kind), a length (Length), a TS value (TSval) and a TS Echo Reply (TSecr). The figure shows a case where the kind indicates 8 and the length indicates 10 bytes.

In the present embodiment, of 4-byte information of the TS Value, one byte is used for storing a block number as data restoration information and in the remaining three bytes, higher-order three bytes of the TS Value are stored.

Such an embodiment in which a region used for data restoration information in the TS Value is modified is, however, possible such as a variation in which of the four-byte information of the TS Value, two bytes are used for storing a block number as data restoration information and lower-order two bytes of the TS Value are stored in the remaining two bytes.

Next, with reference to FIG. 6 and FIG. 7, description will be made of processing at the transmission terminal 2-1 and the reception terminal 2-2 according to the first embodiment. In the following description, the transmission terminal 2-1 and the reception terminal 2-2 show one example of the communication device 1 illustrated in FIG. 1.

FIG. 6 is a flow chart showing outlines of processing by the transmission terminal 2-1 in the first embodiment. With reference to the figure, the transmission terminal 2-1 starts its processing upon execution of arbitrary processing by the application processing unit 1-1 to instruct the data division restoration processing unit 1-2 to transmit data.

In processing 5-1, the data division restoration processing unit 1-2 divides data received from the application processing unit 1-1 into an arbitrary number of blocks. Move to processing 5-2.

In the processing 5-2, the data division restoration processing unit 1-2 allots the divisional block to an arbitrary TCP connection. Move to processing 5-3.

In the processing 5-3, the data division restoration processing unit 1-2 instructs the network processing unit 1-3 to transmit a block. At that time, as information for restoration, the number of block being transmitted is stored in the timestamp option field within the data TCP header. No different block is stored in the same packet. The network processing unit 1-3 sends the block to the network. When all the blocks are transmitted to end arbitrary processing of the application processing unit 1-1, finish the processing.

Figure 7:
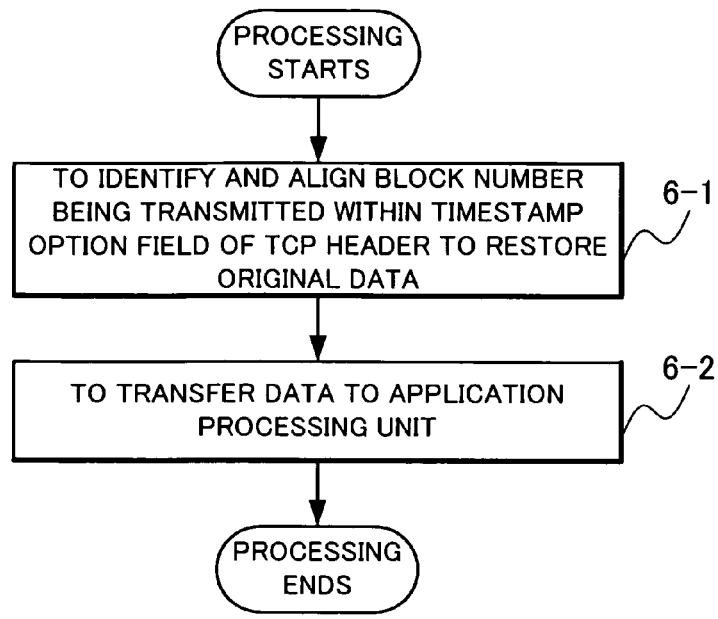
FIG. 7 is a flow chart showing outlines of processing by the reception terminal 2-2 according to the first embodiment.

FIG. 7 is a flow chart showing outlines of processing by the reception terminal 2-2 according to the first embodiment. The reception terminal 2-2 starts its processing by receiving a block transmitted by the transmission terminal 2-1 through the network.

In processing 6-1, the network processing unit 1-3 transfers a block to the data division restoration processing unit 1-2, and the data division restoration processing unit 1-2 refers to a block number stored in the timestamp option field within the TCP header and aligns the same to restore the original data. Move to processing 6-2.

In the processing 6-2, the data division restoration processing unit 1-2 transfers the restored data to the application processing unit 1-1, and the application processing unit 1-1 executes arbitrary processing. When all the blocks are transferred to the application processing unit 1-1 and the arbitrary processing of the application processing unit 1-1 finishes, end the processing.

The foregoing is the contents of the processing of the communication terminal according to the first embodiment of the present invention.

Since according to conventional techniques, dividing data and using information for restoring the data as a part of application data increases application data for storing the same.

On the other hand, according to the above-described first embodiment, including information for restoring data in a widely used timestamp option field of a TCP prevents an increase in application data and invites no overhead for storing restoration information. In addition, a timestamp option can be used at the same time.

Moreover, while the first embodiment shows a method of storing restoration information in a timestamp option, other embodiments are possible of storing restoration information in a part including redundant data out of a TCP/IP (Transmission Control Protocol/Internet Protocol) header and in a part whose data length can be compressed or shrunk.

Possible, for example, is an embodiment in which an IP (Internet Protocol) packet includes a fragment option for dividing one packet, its fragmentation field, which is not used at present when a path MTU (Maximum Transfer Unit) discovery option is commonly used, is used in place of the TCP timestamp option field.

Second Embodiment

Since a structure of a communication device according to a second embodiment of the present invention is the same as that of the first embodiment shown in FIG. 1, description will be here made with reference to FIG. 1 showing the structure of the first embodiment.

In the second embodiment, the communication device 1 includes the application processing unit 1-1, the data division restoration processing unit 1-2 and the network processing unit 1-3.

The application processing unit 1-1 has a function of referring to a maximum packet size set by the data division restoration processing unit 1-2, processing an arbitrary application program which might be communicated with data segmented based on the maximum packet size and when transmitting data, sending the data to the data division restoration processing unit 1-2 and when receiving data, receiving the data from the data division restoration processing unit 1-2.

The data division restoration processing unit 1-2 has a function of referring to each maximum packet size set at a plurality of interfaces of the network processing unit 1-3, publicizing the smallest one of the maximum packet sizes as a representative value to the application, and when transmitting data, receiving data from the application processing unit 1-1, resolving the data into a block of a size based on a multiple of the representative value of the maximum packet size (a fraction generated at the time of division into a block based on a multiple of the maximum packet size is not necessarily a multiple of the representative value of the maximum packet size), storing information for restoring the blocks to the original data within a TCP header and sending the obtained data to the network processing unit 1-3 by using an arbitrary number of TCP connections with the representative value of the maximum packet size set as the maximum usable packet size, and when receiving data, referring to restoration information stored within the TCP header with respect to data of the plurality of TCP connections received from the network processing unit 1-3, identifying and combining divided blocks to restore data as of before the division and sending the obtained data to the application processing unit 1-1.

The network processing unit 1-3 has a function of, when transmitting data, outputting data of a TCP connection received from the data division restoration processing unit 1-2 to the network and when receiving data, sending data of a TCP connection applied from the network to the data division restoration processing unit 1-2.

In addition, another embodiment is possible in which when examining each maximum packet size, a representative value of a maximum packet size is re-adjusted by using a path MTU discovery option provided as an option of the TCP after the communication is started.

FIG. 2 is a block diagram showing a flow of data from the transmission terminal 2-1 to the reception terminal 2-2 according to the second embodiment.

In FIG. 2, when sending data from the transmission terminal 2-1 to the reception terminal 2-2, the transmission terminal 2-1 examines a maximum packet size usable in each of the plurality of TCP connections used in the communication, considers a smallest one of the maximum packet sizes as a representative value to be used in each TCP connection, resolves data to be transmitted into blocks of a size based on a multiple of the representative value of the maximum packet size as shown in FIG. 3 (a fraction generated at the time of division into a block based on a multiple of the maximum packet size is not necessarily a multiple of the representative value of the maximum packet size), stores information for restoring the same within a TCP header and sends the obtained data to the reception terminal 2-2 by using the plurality of TCP connections with the representative value of the maximum packet size set.

FIG. 2 shows an example in which data is divided into the four blocks (1) to (4) and using the two TCP connections (1) and (2), the blocks (1) and (3) are transmitted by the TCP connection (1) and the blocks (2) and (4) are transmitted by the TCP connection (2).

Upon receiving a block from the transmission terminal 2-1, the reception terminal 2-2 refers to restoration information stored within the TCP header, identifies the divided blocks and aligns the blocks in order to restore the original data from the plurality of blocks. In FIG. 2, the reception terminal 2-2 aligns the blocks (1) to (4) received from the TCP connections (1) and (2) in order to restore the original data.

FIG. 4 is a diagram showing an example of storage of data restoration information within the TCP header by the data division restoration processing unit 1-2 according to the second embodiment. After dividing the data to generate a plurality of blocks, the transmission terminal 2-1 stores the block numbers in a part of the timestamp option of the TCP. The timestamp option of the TCP is stored in the option field of the TCP header in the format shown in FIG. 5.

In the second embodiment, of 4-byte information of the TS Value, one byte is used for storing a block number as data restoration information and in the remaining three bytes, higher-order three bytes of the TS Value are stored.

Next, with reference to FIG. 8 and FIG. 9, description will be made of processing of the transmission terminal 2-1 and the reception terminal 2-2 according to the second embodiment.

Figure 8:
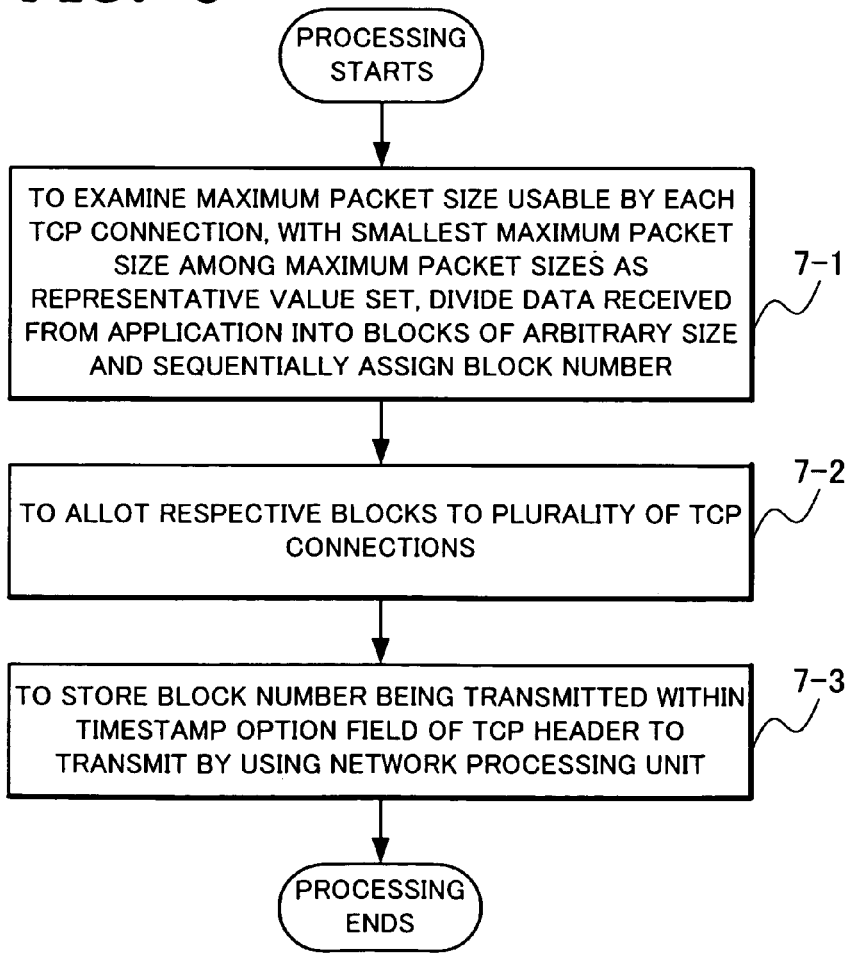
FIG. 8 is a flow chart showing outlines of processing by the transmission terminal 2-1 according to a second embodiment.

FIG. 8 is a flow chart showing outlines of processing by the transmission terminal 2-1 in the second embodiment. The transmission terminal 2-1 starts its processing upon execution of arbitrary processing by the application processing unit 1-1 to instruct the data division restoration processing unit 1-2 to transmit data.

In processing 7-1, the data division restoration processing unit 1-2 examines a maximum packet size usable in each of the TCP connections and sets a smallest one of the respective maximum packet sizes as a representative value to be used when using each TCP connection. Divide data received from the application processing unit 1-1 into blocks of a size based on a multiple of the representative value of the maximum packet size (a fraction generated at the time of division into a block based on a multiple of the maximum packet size is not necessarily a multiple of the representative value of the maximum packet size) and move to processing 7-2.

In the processing 7-2, the data division restoration processing unit 1-2 allots divided blocks to arbitrary TCP connections. Move to processing 7-3.

In the processing 7-3, the data distribution restoration processing unit 1-2 instructs the network processing unit 1-3 to transmit a block.

At that time, as information for restoration, the number of the block being transmitted is stored in the timestamp option field within the data TCP header. No block having a different number is stored in the same packet.

The network processing unit 1-3 sends the block to the network. When all the blocks are transmitted to finish arbitrary processing of the application processing unit 1-1, end the processing.

Figure 9:
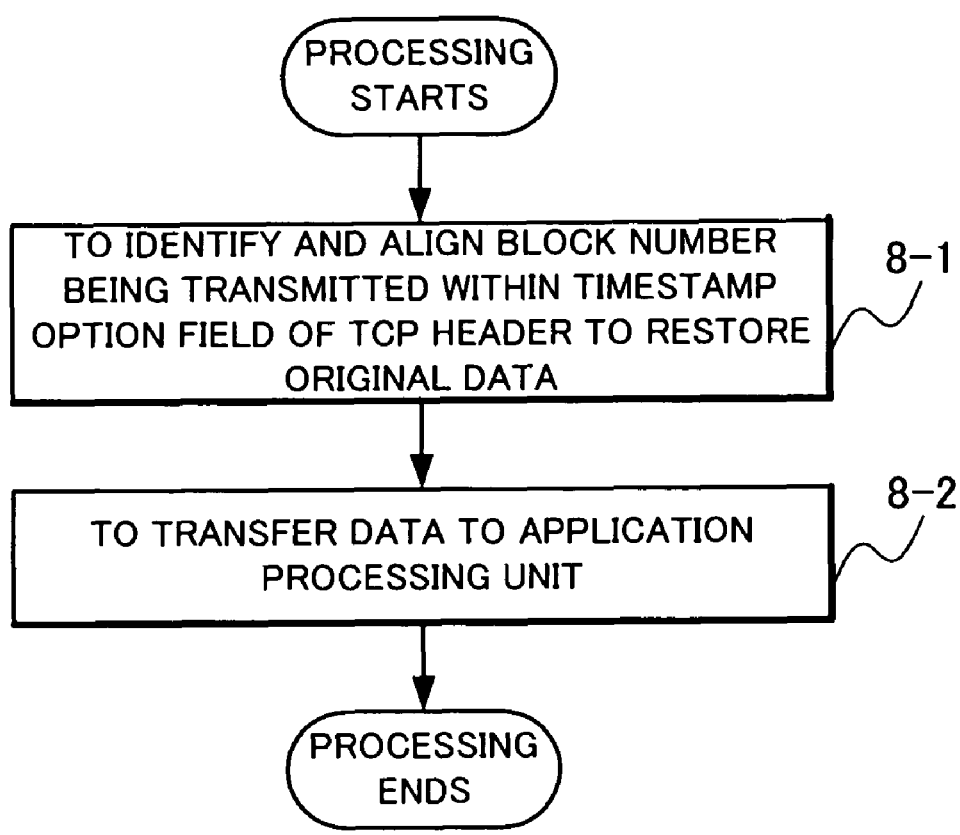
FIG. 9 is a flow chart showing outlines of processing by the reception terminal 2-2 according to the second embodiment.

FIG. 9 is a flow chart showing outlines of processing by the reception terminal 2-2 according to the second embodiment.

The reception terminal 2-2 starts its processing upon receiving a block transmitted by the transmission terminal 2-1 through the network.

In processing 8-1, the network processing unit 1-3 transfers a block to the data division restoration processing unit 1-2, and the data division restoration processing unit 1-2 refers to a block number stored in the timestamp option field within the TCP header and aligns the same to restore original data. Move to processing 8-2.

In the processing 8-2, the data division restoration processing unit 1-2 transfers the restored data to the application processing unit 1-1, and the application processing unit 1-1 executes arbitrary processing. When all the blocks are transferred to the application processing unit 1-1 to finish the arbitrary processing of the application processing unit 1-1, end the processing.

The foregoing is the contents of the processing of the communication terminal according to the second embodiment of the present invention.

Since according to conventional techniques, division into blocks is executed without considering a maximum packet size of each TCP connection, a packet might be fragmented in each TCP connection to reduce communication efficiency.

Since with the communication device according to the present invention, an MSS (Max Segment Size) usable in each TCP connection is examined and division into blocks is executed based on the examination result, efficient communication can be realized.

Third Embodiment

Since a structure of a communication device according to a third embodiment of the present invention is the same as that of the second embodiment shown in FIG. 1, description will be here made with reference to FIG. 1 showing the structure of the second embodiment.

Figure 10:
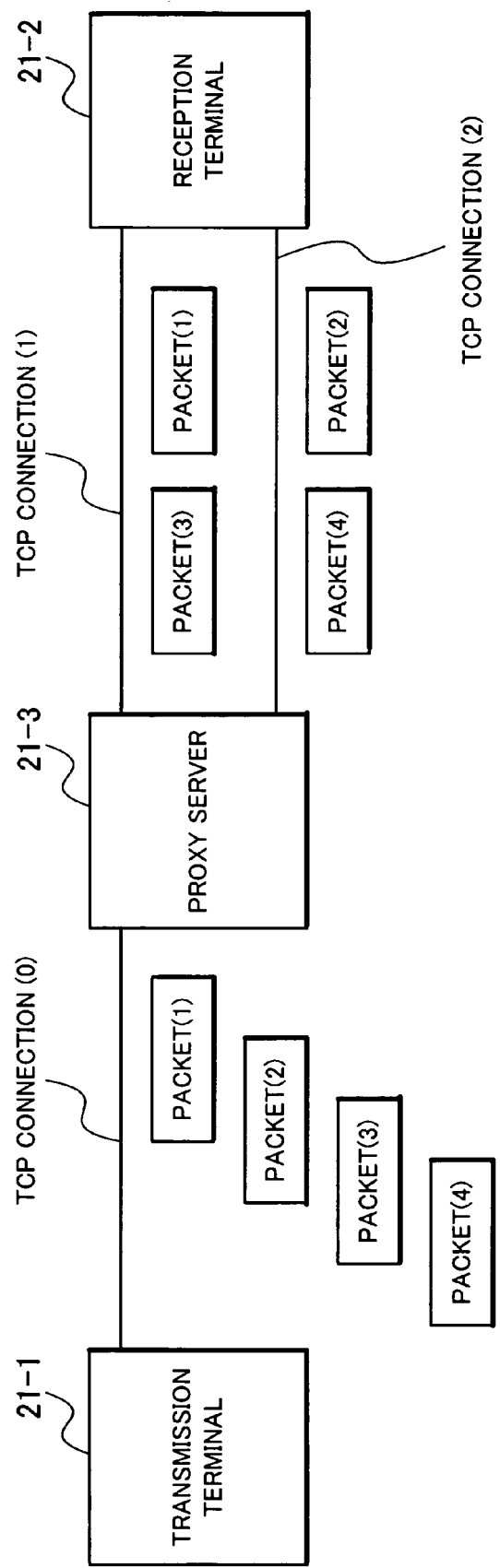
FIG. 10 is a block diagram showing a flow of data among a transmission terminal 21-1, a proxy server 21-3 and a reception terminal 21-2 according to a third embodiment.

In the third embodiment, as shown in FIG. 10, description will be made of communication of a proxy server 21-3 as a communication device using the communication method according to the second embodiment of the present invention with a reception terminal 21-2 and a transmission terminal 21-1 which realizes conventional communication by TCP/IP. In the following description, the proxy server 21-3 shows one example of the communication device 1 illustrated in FIG. 1.

FIG. 10 is a block diagram showing a flow of data among the transmission terminal 21-1, the proxy server 21-3 and the reception terminal 21-2 in the third embodiment.

In the application processing unit 1-1 of the proxy server 21-3, a proxy server for realizing communication between the transmission terminal 21-1 and the reception terminal 21-2 operates to transfer and transmit packets (1) to (4) received from the transmission terminal 21-1 by conventional TCP/IP communication to the reception terminal 21-2.

The proxy server 21-3 sets, as a representative value of a maximum packet size usable in the present communication, a smallest one of maximum packet sizes usable in each of a TCP connection (0), a TCP connection (1) and a TCP connection (2) as TCP connections related to communication. The proxy server 21-3 notifies the transmission terminal 21-1 and the reception terminal 21-2 of the representative value of the maximum packet size usable in the present communication to set up a TCP connection.

Using a packet whose size is not more than the packet size notified by the proxy server 21-3, the transmission terminal transmits the packet to the proxy server 21-3. The proxy server 21-3 transfers the data received from the transmission terminal 21-1 and sends out the packets to the reception terminal 21-2 by using the TCP connection (1) and the TCP connection (2).

In FIG. 10, the transmission terminal 21-1 transmits the packets (1) to (4) to the proxy server 21-3 by one TCP connection (0) according to conventional techniques and the proxy server 21-3 allots the packets received through the TCP connection (0) to the TCP connection (1) and the TCP connection (2) to transmit the same to the reception terminal 21-2.

As described in the foregoing, in the communication method according to the present invention, communication is executed by using a smallest one of maximum packet sizes usable in the respective TCP connections related to communication. In addition, when sending data distributed to a plurality of connections, storing restoration information within an existing TCP header invites no increase in communication data. As a result, when used as a proxy server which sends out a packet received through one TCP connection by using a plurality of TCP connections as in the third embodiment, a resultant packet having completely the same data as that of a received packet can be transmitted as it is to increase a possibility of executing normal communication with high affinity with existing communication.

Fourth Embodiment

Since a structure of a communication device according to a fourth embodiment of the present invention is the same as that of the first embodiment shown in FIG. 1, description will be here made with reference to FIG. 1 showing the structure of the first embodiment.

In the fourth embodiment, the communication device 1 includes the application processing unit 1-1, the data division restoration processing unit 1-2 and the network processing unit 1-3.

The application processing unit 1-1 has a function of processing an arbitrary application program and when transmitting data, sending the data to the data division restoration processing unit 1-2 and when receiving data, receiving the data from the data division restoration processing unit 1-2.

The data division restoration processing unit 1-2 has a function of, when transmitting data, receiving the data from the application processing unit 1-1, dividing the data into an arbitrary number of blocks, adding, as information for restoring the blocks to the original data, a sequence number indicative of a position of a block in the original data and the size of the block to the top of the block, allotting the respective blocks to an arbitrary number of TCP connections and sending the blocks to the network processing unit by using the TCP connection, and when receiving data, referring to a sequence number and the size of a block stored at the top of the block with respect to data of the plurality of TCP connections received from the network processing unit, restoring data as of before division by alignment and sending the obtained data to the application processing unit 1-1.

The network processing unit 1-3 has a function of, when transmitting data, outputting data of a TCP connection received from the data division restoration processing unit 1-2 to the network and when receiving data, sending data of a TCP connection applied from the network to the data division restoration processing unit 1-2.

Figure 11:
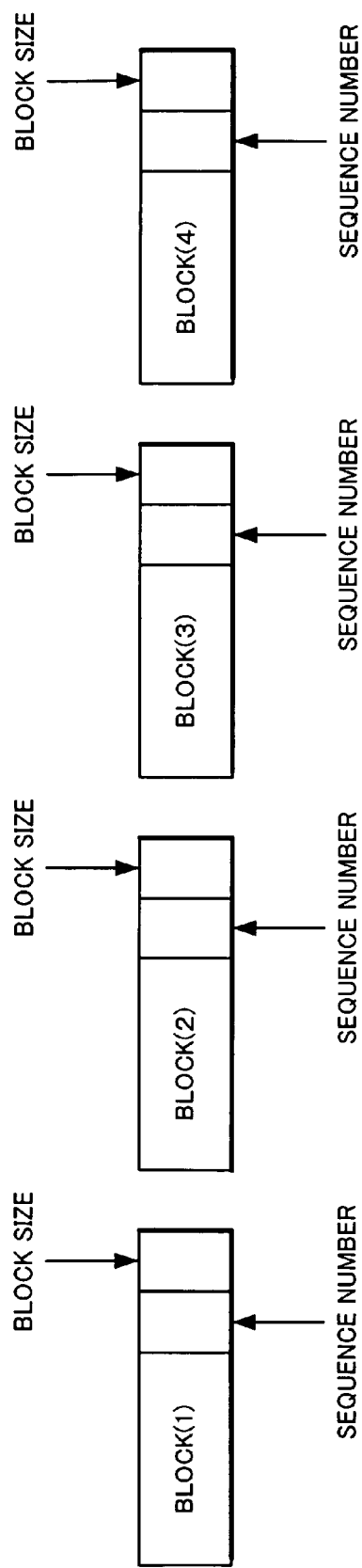
FIG. 11 is a diagram showing an example of storage of data restoration information at the top of a block by a data division restoration processing unit 1-2 according to a fourth embodiment.

FIG. 2 is a block diagram showing a flow of data from the transmission terminal 2-1 to the reception terminal 2-2 in the fourth embodiment and FIG. 11 is a diagram showing blocks into which data is divided in the fourth embodiment.

In FIG. 2, when sending data from the transmission terminal 2-1 to the reception terminal 2-2, the transmission terminal 2-1 divides data to be transmitted into a plurality of blocks as shown in FIG. 3 and adds, as information for restoring the data, a sequence number indicative of a position of a block in the original data and a block size to the top of the block a shown in FIG. 11 to send the obtained data to the reception terminal 2-2 by using the plurality of TCP connections.

FIG. 2 shows an example in which data is divided into the four blocks (1) to (4) and using the two TCP connections (1) and (2), the blocks (1) and (3) are transmitted by the TCP connection (1) and the blocks (2) and (4) are transmitted by the TCP connection (2).

Upon receiving a block from the transmission terminal 2-1, the reception terminal 2-2 refers to a sequence number and a block size stored at the top of the block, identifies the divided blocks and aligns the blocks in order to restore the original data from the plurality of blocks. In FIG. 2, the reception terminal 2-2 aligns the blocks (1) to (4) received from the TCP connections (1) and (2) in order to restore the original data.

FIG. 11 is a diagram showing an example of storing data restoration information at the top of a block by the data division restoration processing unit 1-2 according to the fourth embodiment.

After dividing data as shown in FIG. 3 to generate a plurality of blocks, the transmission terminal 2-1 adds a sequence number indicative of a position in data as of before block division and a size of each block to the top of the block as shown in FIG. 4.

Next, with reference to FIG. 12 and FIG. 13, processing at the transmission terminal 2-1 and the reception terminal 2-2 in the fourth embodiment will be described.

Figure 12:
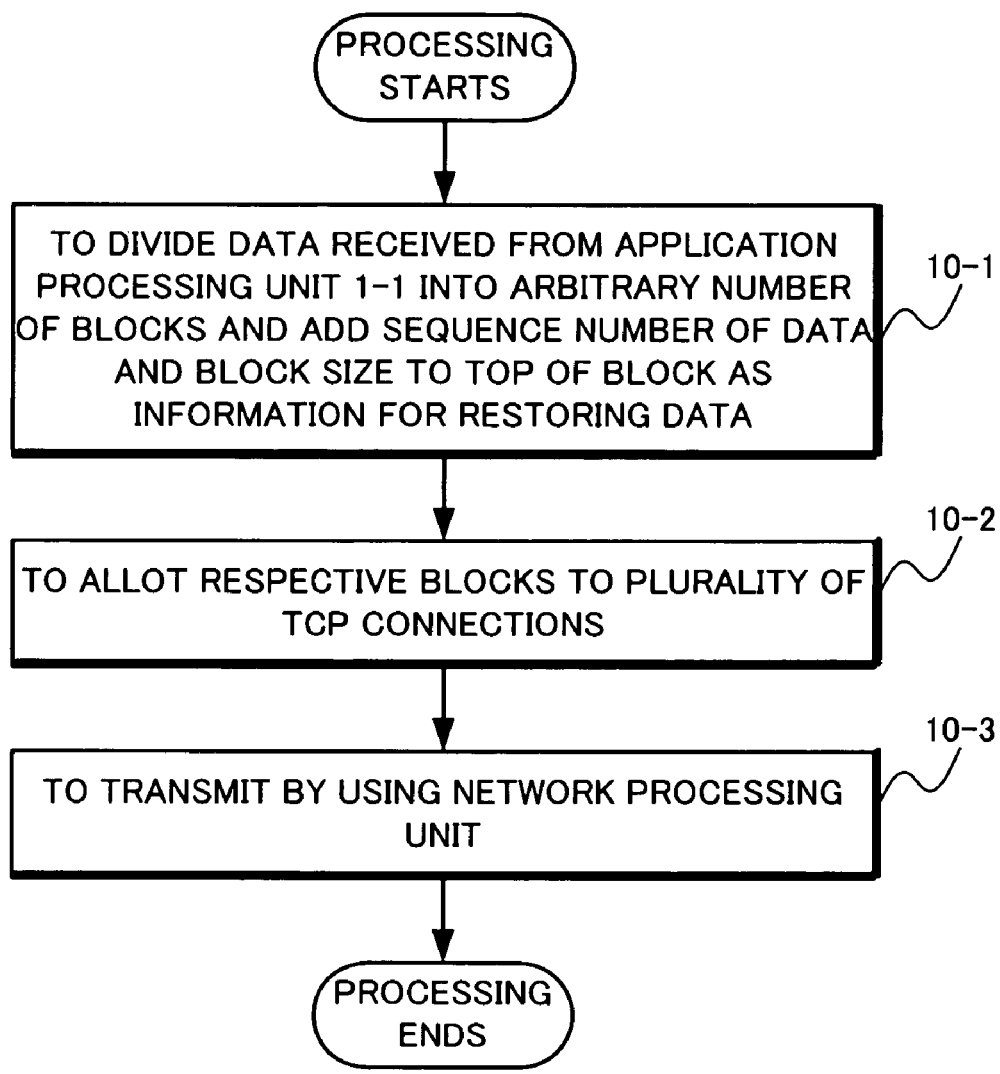
FIG. 12 is a flow chart showing outlines of processing by the transmission terminal 2-1 according to the fourth embodiment.

FIG. 12 is a flow chart showing outlines of the processing at the transmission terminal 2-1 in the fourth embodiment. The transmission terminal 2-1 has its processing started when the application processing unit 1-1 executes arbitrary processing to instruct the data division restoration unit 1-2 to transmit data.

In processing 10-1, the data division restoration processing unit 1-2 divides data received from the application processing unit 1-1 into an arbitrary number of blocks and as information for restoring the data, adds a sequence number of the data and the size of a block to the top of the block. Move to processing 10-2.

In processing 10-2, the data division restoration processing unit 1-2 allots a divisional block to an arbitrary TCP connection. Move to processing 10-3.

In the processing 10-3, the data division restoration processing 1-2 instructs the network processing unit 1-3 to transmit a block. When all the blocks are transmitted to complete arbitrary processing of the application processing unit 1-1, end the processing.

Figure 13:
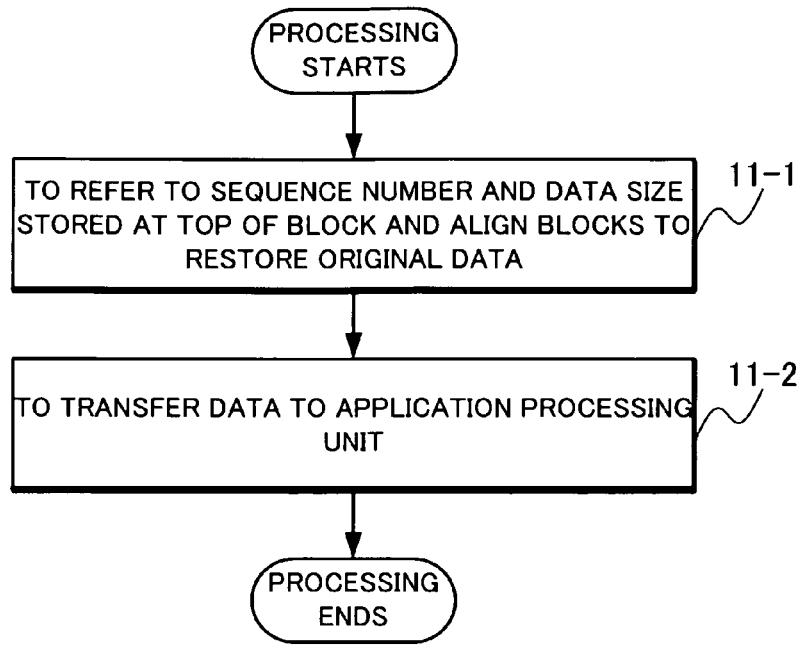
FIG. 13 is a flow chart showing outlines of processing by the reception terminal 2-2 according to the fourth embodiment.

FIG. 13 is a flow chart showing outlines of the processing of the reception terminal 2-2 in the fourth embodiment. The reception terminal 2-2 starts processing upon receiving a block through the network which is transmitted by the transmission terminal 2-1.

In processing 11-1, the network processing unit 1-3 transfers a block to the data division restoration processing unit 1-2, and the data division restoration processing unit 1-2 refers to the sequence number and the block size stored at the top of the block and aligns the blocks to restore the original data. Move to processing 11-2.

In the processing 11-2, the data division restoration processing unit 1-2 transfers the restored data to the application processing unit 1-1, and the application processing unit 1-1 executes arbitrary processing. When all the blocks are transferred to the application processing unit 1-1 to complete the arbitrary processing of the application processing unit 1-1, end the processing.

The foregoing is the contents of the processing of the communication terminal according to the fourth embodiment of the present invention.

According to conventional techniques, when an unexpected proxy server exists on a communication path to change a segment of data, it is impossible to restore data at a reception terminal.

On the other hand, as described in the foregoing, according to the fourth embodiment, by dividing data into a plurality of blocks and storing a length of a divisional block in information for restoring the data, even when an unexpected proxy server exists on a communication path to change a segment of data, data can be restored at a reception terminal.

Fifth Embodiment

Since a structure of a communication device according to a fifth embodiment of the present invention is the same as that of the first embodiment shown in FIG. 1, description will be here made with reference to FIG. 1 showing the structure of the first embodiment.

In the fifth embodiment, the present communication device 1 includes the application processing unit 1-1, the data division restoration processing unit 1-2 and the network processing unit 1-3.

The application processing unit 1-1 has a function of processing an arbitrary application program and when transmitting data, sending the data to the data division restoration processing unit 1-2 and when receiving data, receiving the data from the data division restoration processing unit 1-2.

The data division restoration processing unit 1-2 has a function of, when transmitting data, receiving data from the application processing unit 1-1, examining a communication rate of each TCP connection by using an arbitrary number of TCP connections for transmitting data and when the communication rate is low, dividing the data into a small block and when the communication rate is high, dividing the data into a larger block and sending the block to the network processing unit 1-3 by using an arbitrary number of TCP connections, and when receiving data, referring to restoration information stored within a TCP header with respect to data of the plurality of TCP connections received from the network processing unit 1-3, identifying divisional blocks, combining them to restore data as of before division and sending the restored data to the application processing unit 1-1.

The network processing unit 1-3 has a function of, when transmitting data, outputting data of a TCP connection received from the data division restoration processing unit 1-2 to the network and when receiving data, sending data of a TCP connection applied from the network to the data division restoration processing unit 1-2.

Figure 14:
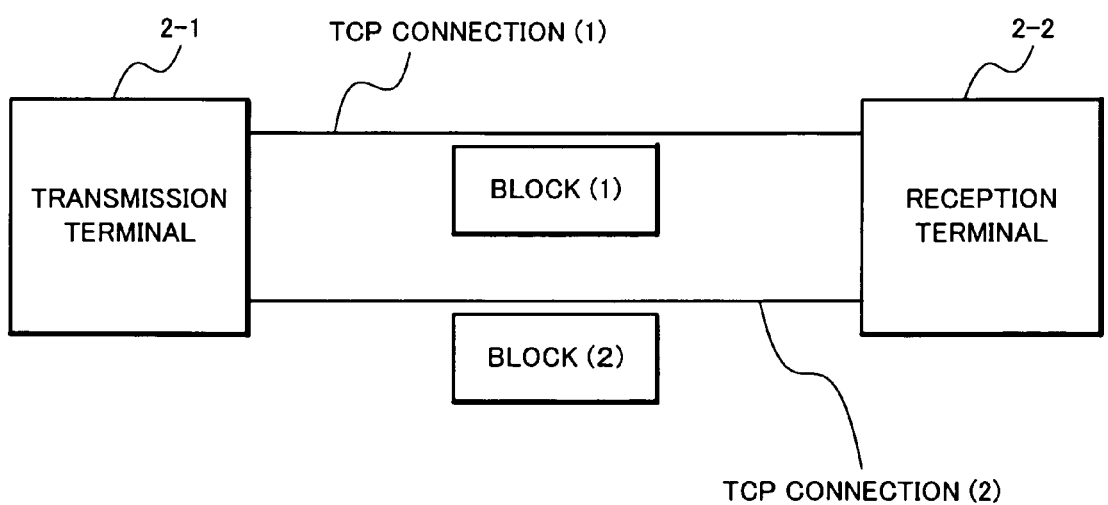
FIG. 14 is a block diagram showing a flow of data between a transmission terminal and a reception terminal when a communication rate is high according to a fifth embodiment.
Figure 15:
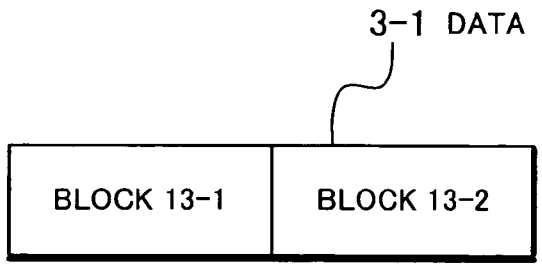
FIG. 15 is a diagram showing a data dividing method and a divided block when the communication rate is high according to the fifth embodiment.

FIG. 2 is a block diagram showing a flow of data from the transmission terminal 2-1 to the reception terminal 2-2 according to the fifth embodiment, FIG. 14 is a block diagram showing a flow of data between the transmission terminal and the reception terminal when a communication rate is high in the fifth embodiment, and FIG. 15 is a diagram showing a data division method when a communication rate is high and a divisional block in the fifth embodiment.

In FIG. 2, when sending data from the transmission terminal 2-1 to the reception terminal 2-2, the transmission terminal 2-1 examines a communication rate of each TCP connection used and divides data to be transmitted into a plurality of blocks as shown in FIG. 3.

When the communication rate of each TCP connection is examined to find that a total of communication rate examination results is small, reduce the size of a divisional block and when the total of the communication rate is large, increase the size of a divisional block. Next, combine divisional blocks to store information for restoring original data within the TCP header and send the obtained data to the reception terminal 2-2 by using the plurality of TCP connections.

In a case where the communication rate is low, for example, as shown in FIG. 3, divide data into the four blocks (1) to (4) and using the two TCP connections (1) and (2), transmit the blocks (1) and (3) by the TCP connection 1 and transmit the blocks (2) and (4) by the TCP connection 2 as shown in FIG. 2 and in a case where the communication rate is high, with the number of divisional blocks increased, divide the data into the two blocks (1) and (2) as shown in FIG. 15 and using the two TCP connections (1) and (2), transmit a block 13-1 by the TCP connection (1) and transmit a block 13-2 by the TCP connection (2) as shown in FIG. 14.

The reception terminal 2-2 having received a block from the transmission terminal 2-1 refers to the restoration information stored within the TCP header, identifies divisional blocks and align the blocks in order to restore original data from the plurality of blocks. In FIG. 2, the reception terminal 2-2 aligns in order the blocks (1) to (4) received from the TCP connections (1) and (2) to restore the original data.

Similarly, in FIG. 14, the reception terminal 2-2 aligns in order the blocks 13-1 and 13-2 received from the TCP connections (1) and (2) to restore the original data.

FIG. 4 shows an example in which data restoration information is stored within the TCP header by the data division restoration processing unit 1-2 in the fifth embodiment. After dividing data to generate a plurality of blocks, the transmission terminal 2-1 stores their block numbers in a part of the TCP timestamp option. The TCP timestamp option is stored in the option field of the TCP header in the format shown in FIG. 5.

In the fifth embodiment, of 4-byte information of the TS Value, one byte is used for storing a block number as data restoration information and in the remaining three bytes, higher-order three bytes of the TS Value are stored.

Another embodiment in which a region in the TS Value used for data restoration information is changed is, however, possible such as a variation in which of the four-byte information of the TS Value, two bytes are used for storing a block number as data restoration information and lower-order two bytes of the TS Value are stored in the remaining two bytes.

Next, with reference to FIG. 16 and FIG. 17, description will be made of processing at the transmission terminal 2-1 and the reception terminal 2-2 according to the fifth embodiment.

Figure 16:
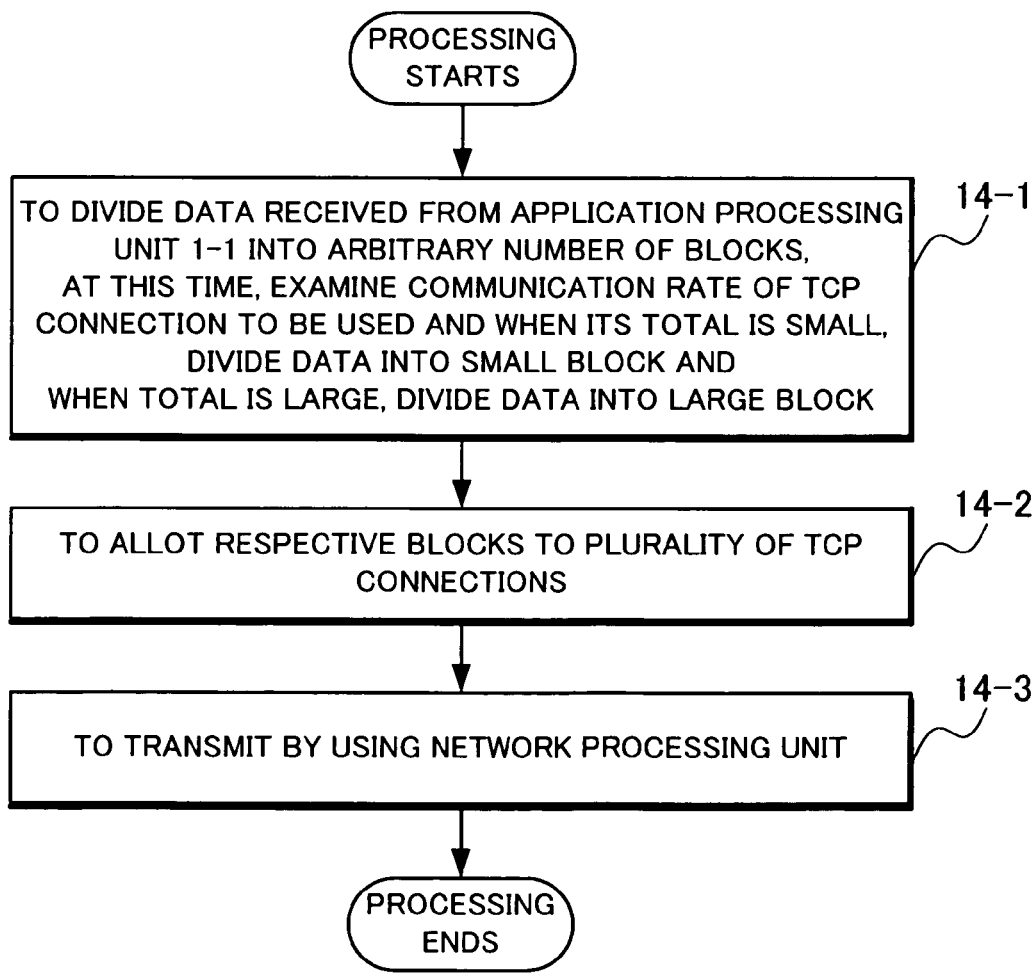
FIG. 16 is a flow chart showing outlines of processing by the transmission terminal 2-1 according to the fifth embodiment.

FIG. 16 is a flow chart showing outlines of the processing of the transmission terminal 2-1 in the fifth embodiment. The transmission terminal 2-1 has its processing started upon execution of arbitrary processing by the application processing unit to instruct the data division restoration unit 1-2 to transmit data.

In processing 14-1, the data division restoration processing unit 1-2 divides the data received from the application processing unit 1-1 into an arbitrary number of blocks. At that time, examine a communication rate of a TCP connection to be used and when the total is small, divide the data into a small block and when the total is large, divide the data into a larger block. Move to processing 14-2.

In processing 14-2, the data division restoration processing unit 1-2 allots a divisional block to an arbitrary TCP connection. Move to processing 14-3.

In processing 14-3, the data division restoration processing unit 1-2 instructs the network processing unit 1-3 to transmit the block. At this time, store the number of the block being transmitted as information for restoration in the timestamp option field within the data TCP header. As to a block of different number, it is not stored in the same packet.

The network processing unit 1-3 sends out the block to the network. When all the blocks are transmitted to complete the arbitrary processing of the application processing unit 1-1, end the processing.

Figure 17:
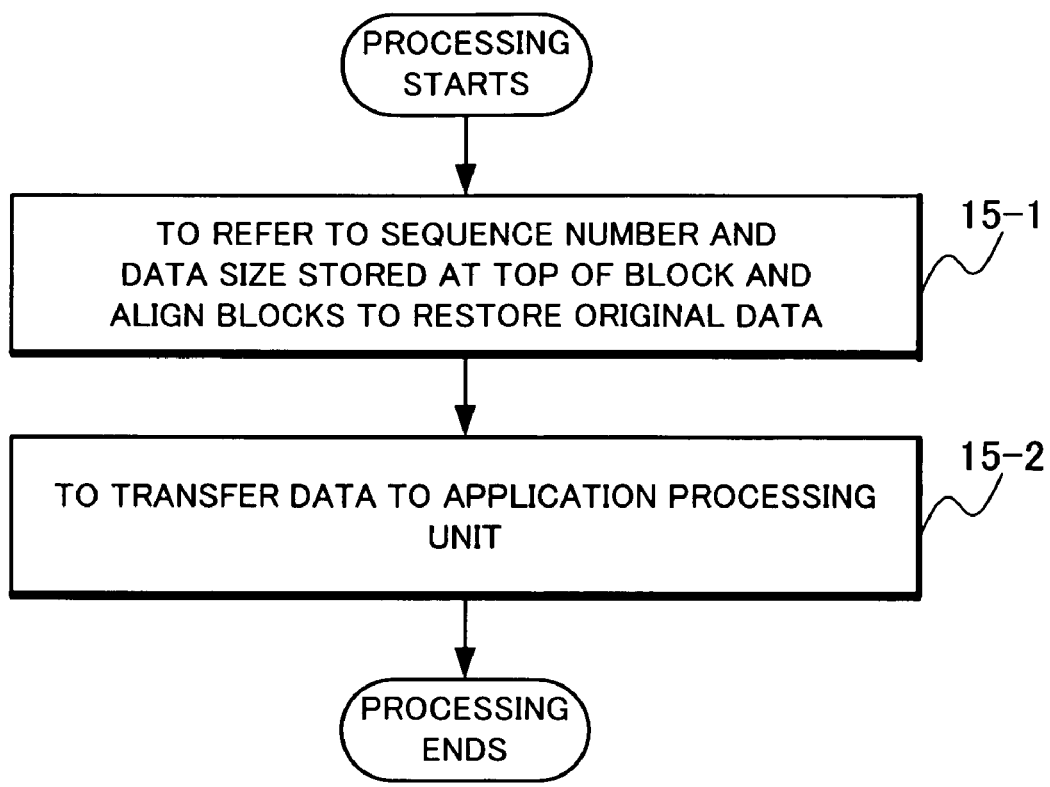
FIG. 17 is a flow chart showing outlines of processing by the reception terminal 2-2 according to the fifth embodiment.

FIG. 17 is a flow chart showing outlines of the processing of the reception terminal 2-2 in the fifth embodiment. The reception terminal 2-2 starts its processing upon receiving a block transmitted through the network by the transmission terminal 2-1.

In processing 15-1, the network processing unit 1-3 transfers a block to the data division restoration processing unit 1-2, and the data division restoration processing unit 1-2 refers to a block number stored in the timestamp option field within the TCP header and aligns the same to restore the original data. Move to processing 15-2.

In the processing 15-2, the data division restoration processing unit 1-2 transfers the restored data to the application processing unit 1-1, and the application processing unit 1-1 executes arbitrary processing. When all the blocks are transmitted to the application processing unit 1-1 to complete the arbitrary processing of the application processing unit 1-1, end the processing.

The foregoing is the contents of the processing by the communication terminal according to the fifth embodiment.

According to the conventional techniques, divided data is allotted to a plurality of TCP connections irrespective of a communication rate and when transmitting data by a different TCP connection, the number of instructions to transfer data to a TCP connection is increased to have heavy processing load.

On the other hand, in the fifth embodiment as described above, when a communication rate is high, by increasing the size of a block to be transferred to a TCP connection, the size transferred by one transmission instruction is increased to reduce the number of transmission instructions and conversely when the communication rate is low, by reducing the size of a block to be transferred to a TCP connection, communication can be realized by using a plurality of communication lines in parallel, thereby increasing use efficiency of a communication line.

In addition, while in the fifth embodiment, the data division restoration processing unit 1-2 examines a communication rate of a TCP connection to be used at the time of transmitting data and when the communication rate is low, divides the data into a small block and when the communication rate is high, divides the data into a larger block, an embodiment in place thereof is also possible in which with a size of a divisional block fixed, when the communication rate is low, one block is transferred to one TCP connection by one write instruction and when the communication rate is high, a plurality of blocks are successively transferred to one TCP connection by one write instruction to the network processing unit.

Moreover, while in the fifth embodiment, the data division restoration processing unit 1-2, at the time of transmitting data, examines a communication rate of a TCP connection to be used, another embodiment is also possible in which referring to a congested window of a TCP to estimate a communication rate replaces examination of a communication rate.

Furthermore, while in the fifth embodiment, the data division restoration processing unit 1-2, at the time of transmitting data, examines a communication rate of a TCP connection to be used, a further embodiment is also possible in which examination of a communication rate is replaced by assuming a communication rate to be low for a while after the communication is started and assuming the communication rate to be increased as time passes after the communication is started.

In addition, while in the fifth embodiment, the data division restoration processing unit 1-2, at the time of transmitting data, examines a communication rate of a TCP connection to be used, a still further embodiment is also possible in which examination of a communication rate is replaced by assuming, when the size of data transferred from the application processing unit is large, that a communication rate is high and when the data is small, assuming that the communication rate is low.

Sixth Embodiment

The above-described communication device 1 in FIG. 1 has been described to include the application processing unit 1-1, the data division restoration processing unit 1-2 and the network processing unit 1-3. It is also possible to add a memory 18 and a control unit 19 to make a program and obtain a right thereof.

Stored in the memory 18 are the programs illustrated by the above-described flow charts shown in FIG. 6 to FIG. 9, FIG. 12, FIG. 13, FIG. 16 and FIG. 17. The control unit 19 reads these programs stored in the memory 18 and controls the application processing unit 1-1, the data division restoration processing unit 1-2 and the network processing unit 1-3 according to these programs.

While in the first to sixth embodiments, the communication device using a TCP connection and the communication method and the program thereof have been described, the present invention is not limited thereto but applicable to a communication device using a connection by a transport protocol of OSI (Open System Interconnection) four layers, TCP, SCTP (Stream Control Transport Protocol), UDP (User Datagram Protocol) and DCCP (Datagram Congestion Control Protocol).

According to the foregoing described present invention, since information for use in flow division and restoration is stored within a header generated by a terminal when sending data, it is not necessary to store a new header for data division and restoration within a packet, so that no header will be increased.

In addition, according to the present invention, since a segment size usable in each flow related to communication is examined at the start of communication to determine a segment size used in each flow based on the examination result, even when data crosses over from a certain flow to another flow, data re-segmentation is unnecessary to enable normal communication.

Moreover, according to the present invention, storing the size of a block in information for use in data flow division and restoration and referring to the same at the time of data restoration enables data restoration to realize normal communication even when data re-segmentation is executed on a communication path.

Furthermore, according to the present invention, since at the time of dividing data and transmitting the same by a plurality of connections in parallel, the volume of data to be transferred to a connection processing process at one time is adjusted and when a communication rate is low, the data is transferred on a packet basis and when the communication rate becomes high, the data is transferred by a plurality of packets in the lump to a connection, the number of issuances of a write instruction to the connection processing process can be lessened to reduce processing load.

What is claimed is:

1. A communication device for performing communication according to a predetermined protocol, comprising:
a memory; and
a processor,
wherein the processor is configured to execute instructions stored in the memory to divide original data into a plurality of blocks for a separately transmitting the blocks on a plurality of connections, and store information for restoring the plurality of blocks to the original data within a field of a header instead of information to be stored in the field according to the predetermined protocol, and,
wherein the processor is further configured to execute instructions to examine maximum values of a packet size allowed by a connection related to communication, and set a smallest size among said packet size maximum values as a representative value of an allowable packet size, and divide the original data into blocks of a size based on a multiple of the representative value of the maximum packet size and allot divided blocks to said plurality of connections separately.

2. The communication device according to claim 1, wherein the information for restoring the plurality of blacks to the original data is stored in an option field within the header of a transport protocol.

3. The communication device according to claim 1, wherein the processor is further configured to execute instructions to examine maximum values of a packet size allowed by a connection related to communication and communicate with a packet size equal to or less than a smallest size among said packet size maximum values.

4. The communication device according to claim 1, wherein a data length is stored as information for restoring said original data.

5. The communication device according to claim 1,
wherein the processor is configured to execute instructions stored in the memory to receive a plurality of blocks and, based on said information stored within the field of the header, restore the plurality of blocks to original data.

6. The communication device according to claim 5, wherein the header is a header of a transport protocol.

7. The communication device according to claim 5, wherein the information stored within the header is stored in an option field of the header.

8. The communication device according to claim 5, wherein the information stored within the header is stored in a part of a timestamp field of an option field within the header.

9. The communication device according to claim 1, wherein the header is an IP header.

10. The communication device according to claim 1, wherein information for restoring the plurality of blocks to the original data is stored in a fragment field within an IP header.

11. The communication device according to claim 5, wherein the processor is configured to execute instructions stored in the memory to examine a Maximum Transfer Unit (MTU) usable by the plurality of connections by a path MTU discovery option and unify MTU of the respective connections to the smallest MTU obtained by said examination.

12. The communication device according to claim 5, wherein the processor is configured to execute instructions stored in the memory to refer to a data length to restore the plurality of blocks to the original data.

13. The communication device according to claim 1, wherein the processor is further configured to execute instructions to transfer the plurality of blocks based on a communication rate.

14. The communication device according to claim 1, wherein the original data is configured to be restored by referring to the information for restoring the plurality of blocks to the original data within the header.

15. The communication device according to claim 1, wherein the processor is further configured to execute instructions to reduce a volume of data to be transferred when a TCP communication rate is low, and increase the volume of data to be transferred when the TCP communication rate becomes high.

16. A method, comprising:
using a communication device for performing communication according to a predetermined protocol to:
divide original data into a plurality of blocks for separately transmitting the blocks on a plurality of connections;
store information for restoring the plurality of blocks to the original data within a field of a header instead of information to be stored in the field according to the predetermined protocol; and
using the communication device to examine maximum values of a packet size allowed by a connection related to communication, and set a smallest size among said packet size maximum values as a representative value of an allowable packet size, and divide the original data into blocks of a size based on a multiple of the representative value of the maximum packet size and allot divided blocks to said plurality of connections separately.

17. The method according to claim 16, wherein the information for restoring the plurality of blocks to the original data is stored in an option field within the header of a transport protocol.

18. The method according to claim 16, further comprising using the communication device to examine maximum values of a packet size allowed by a connection related to communication and communicate with a packet-size equal to or less than a smallest size among said, packet size maximum values.

19. The method according to claim 16, wherein a data length is stored as the information for restoring said original data.

20. The method according to claim 16, comprising:
using the communication device to:
execute instructions stored in the memory to receive a plurality of blocks and, based on information stored, within the field of the header, restore the plurality of blocks to original data.

21. The method according to claim 20, wherein the header is a header of a transport protocol.

22. The method according to claim 20, wherein the information stored within the header is stored in an option field of the header.

23. The method according to claim 20, wherein the information stored within the header is stored in a part of a timestamp field of an option field within the header.

24. The method according to claim 16, wherein the header is an IP header.

25. The method according to claim 16, wherein the information for restoring the plurality of blocks to the original is stored in a fragment field within an IP header.

26. The method according to claim 20, further comprising using the communication device to examine an MTU usable by the plurality of connections by a path MTU discovery option and unify MTU of the respective connections to the smallest MTU obtained by said examination.

27. The method according to claim 20, further comprising using the communication device to refer to a data length to restore the plurality of blocks to the original data.

28. The method according to claim 16, further comprising using the communication device to transfer the plurality of blocks based on a communication rate.

29. The method according to claim 16, wherein the original data is configured to be restored by referring to the information for restoring the plurality of blocks to the original data within the header.

30. The method according to claim 16, further comprising using the communication device to reduce a volume of data to be transferred when a TCP communication rate is low, and increase the volume of data to be transferred to each connection at one time when the TCP communication rate becomes high.

31. A computer program product embodied on a non-transitory computer-readable storage medium of a communication device for performing communication according to a predetermined protocol, comprising:
    computer code for dividing original data into a plurality of blocks for separately transmitting the blocks on a plurality of connections;
    computer code for storing information for restoring the plurality of blocks to the original data within a field of a header instead of information to be stored in the field according to the predetermined protocol; and
    computer code for examining maximum values of a packet size allowed by a connection related to communication and comprising computer code for setting a smallest size among said packet size maximum values as a representative value of an allowable packet size, and dividing the original data into blocks of a size based on a multiple of the representative value of the maximum packet size and allotting divided blocks to said plurality of connections separately.

32. The computer program product according to claim 31, the information for restoring the plurality of blocks to the original data is stored in an option field within the header of a transport protocol.

33. The computer program product according to claim 31, further comprising computer code for examining maximum values of a packet size allowed by a connection related to communication and comprising computer code for communicating with a packet size equal to or less than a smallest size among said packet size maximum values.

34. The computer program product according to claim 31, further comprising computer code for storing a data length as the information for restoring said original data.

35. The computer program product according to claim 31, comprising:
    computer code for receiving a plurality of blocks and based on information stored within the field of the header; and
    computer code for restoring the plurality of blocks to original data.

36. The computer program product according to claim 35, wherein the header is a header of a transport protocol.

37. The computer program product according to claim 35, wherein the information stored within the header is stored within an option field within the header.

38. The computer program product according to claim 35, wherein the information stored within the header is stored in a part of a timestamp field of an option field within the header.

39. The computer program product according to claim 31, wherein the header is an IP header.

40. The computer program product according to claim 31, wherein information for restoring the plurality of blocks to the original data is stored in a fragment field within an IP header.

41. The computer program product according to claim 35, further comprising computer code for examining an MTU usable by the plurality of connections by a path MTU discovery option and computer code for unifying MTU of the respective connections to the smallest MTU obtained by said examination.

42. The computer program product according to claim 35, further comprising computer code for referring to a data length to restore the plurality of blocks to the original data.

43. The computer program product according to claim 31, further comprising computer code for transferring the plurality of blocks based on a communication rate.

44. The computer program product according to claim 31, further comprising computer code for restoring the plurality of blocks to the original data by referring to the information within the header.

45. The computer program product according to claim 31, further comprising computer code for reducing a volume of data to be transferred when a TCP communication rate is low, and increasing the volume of data to be transferred when the TCP communication rate becomes high.

46. The communication device according to claim 5, wherein the communication device receives the plurality of blocks at different communication rates.

47. The communication device according to claim 5, wherein the communication device is a proxy server.

48. The communication device according to claim 5, wherein the information stored within the header comprises a sequence number and a block size.

49. The method according to claim 20, wherein the communication device receives the plurality of blocks at different communication rates.

50. The method according to claim 20, wherein the communication device is a proxy server.

51. The method according to claim 20, wherein the information stored within the header comprises a sequence number and a block size.

52. The computer program product according to claim 35, wherein the plurality of blocks are received at different communication rates.

53. The computer program product according to claim 35, wherein the computer-readable storage medium is a proxy server.

54. The computer program product according to claim 35, wherein the information stored within the header comprises a sequence number and a block size.

* * * * *